United States Patent [19]

Strait et al.

[11] Patent Number: 4,927,888

[45] Date of Patent: * May 22, 1990

[54] MALEIC ANHYDRIDE GRAFT COPOLYMERS HAVING LOW YELLOWNESS INDEX AND FILMS CONTAINING THE SAME

[75] Inventors: Chad A. Strait; Ricky L. Tabor, both of Lake Jackson; Gerald M. Lancaster, Freeport, all of Tex.

[73] Assignee: The Dow Chemical Company, Midland, Mich.

[*] Notice: The portion of the term of this patent subsequent to Aug. 9, 2005 has been disclaimed.

[21] Appl. No.: 229,078

[22] Filed: Aug. 5, 1988

Related U.S. Application Data

[63] Continuation-in-part of Ser. No. 905,099, Sep. 5, 1986, Pat. No. 4,762,890.

[51] Int. Cl.$^5$ .................. C08F 255/02; C08F 283/00
[52] U.S. Cl. .................................. 525/285; 525/257; 525/539
[58] Field of Search .................. 525/285, 539, 257

[56] References Cited

U.S. PATENT DOCUMENTS

| | | |
|---|---|---|
| 3,177,270 | 4/1965 | Jones et al. . |
| 3,658,948 | 2/1972 | McConnell . |
| 3,776,866 | 12/1973 | Nakayama . |
| 3,868,433 | 2/1975 | Bartz et al. ........................ 525/74 |
| 3,882,194 | 5/1975 | Krebaum et al. . |
| 4,010,223 | 3/1977 | Caywood, Jr. . |
| 4,147,740 | 3/1979 | Swiger . |
| 4,506,056 | 3/1985 | Gaylord ........................... 525/285 |
| 4,639,495 | 1/1987 | Waggoner . |
| 4,684,576 | 8/1987 | Tabor ................................ 525/74 |
| 4,753,997 | 6/1988 | Shyu et al. ....................... 525/285 |
| 4,762,890 | 8/1988 | Strait et al. ...................... 525/285 |

FOREIGN PATENT DOCUMENTS 4144 1/1975 Japan .

OTHER PUBLICATIONS

The Effective Extrusion Variables on the Fundamental Properties of Tubular Polythene Film, Huck and Clegg, pp. 1-14.

*Primary Examiner*—Wilbert J. Briggs, Sr.

[57] ABSTRACT

Maleic anhydride can be satisfactorily grafted to polymers at low pressures by feeding the polymer through a multiple screw extruder and injecting the maleic anhydride and a free radical initiator into the extruder. The maleic anhydride and initiator can be pre-mixed in a solvent solution. The solvent and unreacted maleic anhydride can be removed by low pressure devolatilization. The graft copolymer has a yellowness index as measured by ASTM D-1925-70 less than about 10.0 and as measured by ASTM E-313-73 less than about 11.0. Further, between 0.75 and 2.0 weight percent of the graft copolymer comprises maleic anhydride. The graft copolymer can further be blended with an olefinic polymer to yield adhesive thermoplastics suitable for use as food packaging multilayer coextruded films.

22 Claims, 1 Drawing Sheet

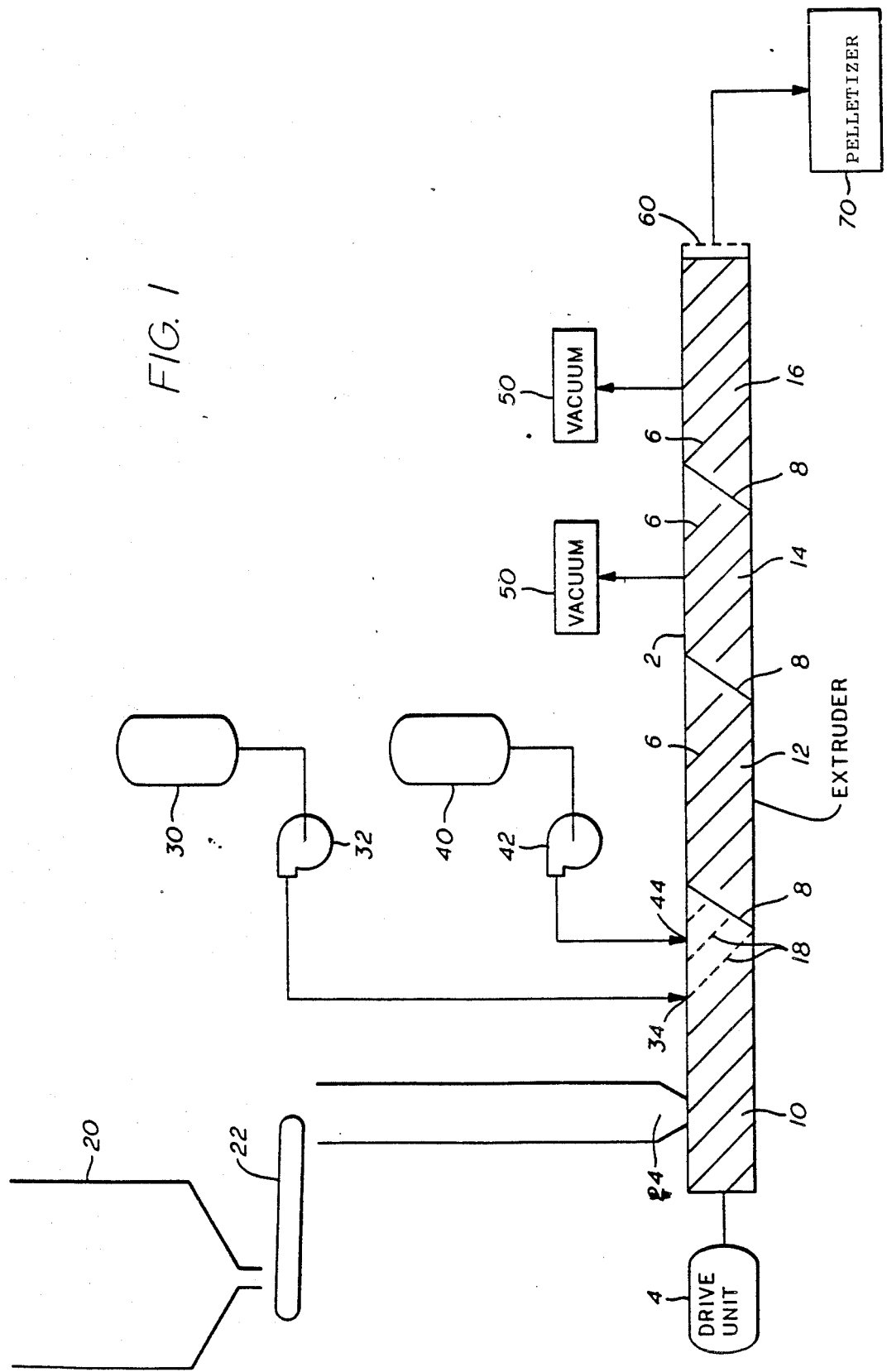

MALEIC ANHYDRIDE GRAFT COPOLYMERS HAVING LOW YELLOWNESS INDEX AND FILMS CONTAINING THE SAME

This application is a continuation-in-part application of U.S. Application Ser. No. 905,099 filed Sept. 5, 1986, now U.S. Pat. No. 4,762,890.

FIELD OF THE INVENTION

This invention relates to a process of grafting monomers, in particular maleic anhydride, to polymers using polymer extruding equipment and products produced therefrom. Such products when blended with a synthetic resin can be coextruded into multilayer films suitable for the packaging of food products.

DESCRIPTION OF THE PRIOR ART

Blends of maleic anhydride graft copolymers and polyolefins have a broad range of applications, including use as a component in food packaging films and pipe coatings.

Processes for grafting an ethylenically unsaturated monomer such as maleic anhydride onto olefinic polymers are well documented in the art. For example, U.S. Pat. No. 3,868,433, issued to Bartz et al., describes a process for grafting maleic anhydride to a polyolefin by free radical initiation wherein the initiator and maleic anhydride are injected at high pressure into a polymer filled, pressurized section of a single screw extruder. U.S. Pat. No. 4,506,056, issued to Gaylord, describes a process for grafting maleic anhydride to ethylenically unsaturated polymers in the presence of nitrogen, phosphorus, or a sulfur-containing compound and contains working examples drawn to the use of a single screw extruder.

Products obtained from such single screw extruder processes are unsuitable for use in food packaging films for three major reasons:

(1) Odor. Incorpoation of monomer in the graft copolymer in the prior art processes is extremely low. Generally the graft copolymer contains less than 0.50 weight percent maleic anhydride. Such graft copolymers contain a significant amount of residual monomer and other impurities which in turn impart to resulting films an extremely unpleasant odor. Such films are unacceptable therefore for use as food packaging material.

(2) High Grain Content. Grain, defined as globular masses discrete from the polymer per se having a diameter between 5 and 15 mils, has long been recognized as adversely affecting clarity and gloss of extruded films. Howells and Benbow, "Flow Defects in Polymer Melts", Trans. J. Plast. Inst. 30 (1962) 240–253, conclude that grain formation is attributed to intermolecular chain entanglement during the extrusion process and that such entanglement can be reduced but not eliminated by shearing. In general, the higher the degree of such chain entangling, the greater the quantity of grain in the extruded film and thus the hazier the film. Films comprising the graft copolymers of the prior art have high levels of grain and thus are not desirable in food packaging applications.

(3) Yellowness. Films produced from the graft copolymers of the prior art further have the undesirable feature of yellow discoloration, aesthetically unacceptable to consumers and thus impractical for food packaging applications.

It would be advantageous to devise a procedure for producing a maleic anhydride graft copolymer which, when blended with a polyolefin, would render a film suitable for use as a food packaging material. In particular, it would be desirable to produce a graft copolymer containing greater than 0.50 weight percent incorporated maleic anhydride with a low yellowness index which, when blended with a polyolefin, renders a film with low grain content.

SUMMARY OF THE INVENTION

In accordance with the present invention, a process of grafting maleic anhydride to polymers has been discovered. The method comprises the steps of melting a polymer by heating and shearing the polymer in a multiple screw extruder, injecting maleic anhydride and a free radical initiator into a polymer filled, pressurized section of the extruder, and mixing the polymer and the maleic anhydride in the extruder for sufficient time to graft the maleic anhydride to the polymer. The maleic anhydride and the free radical initiator are preferably mixed in a solvent system prior to injection into the extruder. Devolatilization of the graft copolymer preferably occurs in one or more decompression sections of the extruder.

In a second aspect of this invention is disclosed a graft copolymer having a yellowness index as measured according to ASTM D-1925 of less than 10.0 and wherein between 0.50 and 2.0 weight percent of the graft copolymer comprises maleic anhydride.

In still another aspect of this invention, there is disclosed a multilayer coextruded film used for packaging foods containing at least two layers wherein at least one layer comprises a blend of (a) between about 1.5 to about 75.0 weight percent graft copolymer having a yellowness index as measured according to ASTM-D-1925 of less than 10.0 wherein the graft copolymer comprises the reaction product of maleic anhydride and backbone polymer and further wherein the graft copolymer comprises between 0.5 and 2.0 weight percent of maleic anhydride and, (b) between about 25.0 to about 98.5 weight percent polyolefin.

BRIEF DESCRIPTION OF THE DRAWING

FIG. 1 is a schematic drawing of a preferred apparatus for grafting maleic anhydride to polymers.

DETAILED DESCRIPTION OF A PREFERRED EMBODIMENT

The present invention is directed towards an extrusion process of grafting maleic anhydride onto a polymer backbone. The resulting novel graft copolymer has a yellowness index as measured in accordance with ASTM D-1925-70 and ASTM E-313-73 less than about 10 and 11, respectively and has particular applicability as a component in a multilayer extruded film; the latter being particularly useful as a food packaging material.

The graft copolymer of this invention is manufactured in a multiple screw extruder comprising positive and negative conveyance screw elements, and lobed kneading/mixing plates, paddles or blocks. In general, positive conveyance screw elements convey the polymer-maleic anhydride stream away from the first zone of the extruder (wherein the polymer, maleic anhydride and initiator are initially received and mixed) and towards the latter zones of the extruder (wherein the polymer is devolatilized and discharged from the extruder). Negative conveyance screw elements attempt to force the stream away from the last zone and towards the first zone. It is the negative conveyance screw elements which act to backup polymer or fill the extruder region located upstream of them. In essence, any multiple screw extruder containing screw elements with similar means as those described herein may be employed. Such screws could conceivably counter-rotate to each other.

A representative example of a suitable multiple screw extruder for use in this invention is the fully intermeshing co-rotating twin screw extruder, schematically illustrated in FIG. 1. The term "co-rotating" means that all of the screw elements rotate in the same direction at the same rate of revolution. The invention will be described with reference to this figure although it is understood that any multiple screw extruder containing similar means as those discussed above may be employed.

Drive unit 4 rotates positive conveyance elements 6, negative conveyance elements 8, and mixing/kneading paddles or blocks 18 within the extruder barrel 2. The positive conveyance elements 6 generally convey material within the extruder barrel 2 from left to right on FIG. 1. The negative conveyance elements 8 momentarily retard the movement of the material causing the material to backup and fill a portion of the extruder barrel 2 upstream of that negative conveyance element 8. The negative conveyance elements 8 divide the extruder barrel 2 into four separate zones 10, 12, 14, 16. A first zone 10 includes positive conveyance elements 6 and mixing type elements 18 for receiving and mixing a polymer, maleic anhydride, and a free radical initiator. A second zone 12 contains positive conveyance elements 6 and further mixes the polymer by shearing action while grafting occurs. If additional mixing or residence time is desired, negative conveyance 8, or mixing/kneading paddles 18 may be substituted for some of the positive conveyance elements 6 in zone 12 of the extruder. A third zone 14 and a fourth zone 16 contain positive conveyance elements 6 and are provided to devolatilize the polymer as described more fully below.

A base or backbone polymer is fed in pellet form from a feed hopper 20 to a feed metering conveyer 22 and then to a feed inlet 24 in the extruder barrel 2. The feed inlet 24 is positioned near the beginning of the first zone 10 within the extruder barrel 2. The backbone polymer can include, but is not limited to, (i) a polyolefin such as polypropylene, poly (4-methylpentene), high density polyethylene, "HDPE" (densities from 0.940 gram/cm$^3$ to 0.965 grams/cm$^3$), low density polyethylene, "LDPE". The principal distinctions of such polymers are well known to those skilled in the art and are fully described in U.S. Pat. No. 4,327,009, herein incorporated by reference; (ii) linear low density polyethylene, "LLDPE" (densities from 0.870 grams/cm.$^3$ to 0.939 grams/cm$^3$) or linear copolymers of ethylene and α-olefins having between about 3 to about 10 carbon atoms such as 1-octene; (iii) copolymers of ethylene and carbon monoxide; and (iv) copolymers of ethylene and an ethylenically unsaturated carboxylic acid or derivative including, but not being limited to, those selected from the group consisting of acrylic acid, methacrylic acid, alkylacrylates (such as ethylacrylate, butyl acrylate, etc.) and vinyl acetate.

The extruder barrel 2 is heated, preferably by clamped-on electric elements, or cooled, preferably by circulating water, to control the temperature of the polymer. The temperature within each of the four zones 10, 12, 14, 16 is independently controlled to obtain the desired temperature profile, even when processing polymers having different melt characteristics.

Maleic anhydride and a free radical initiator are injected into the polymer filled, pressurized section of the extruder barrel 2, preferably at the mixing elements 18 at the end of the first zone 10. As used herein, the phrase "polymer filled" when used in reference to the extruder refers to that section wherein the flights of the screw and substantially all voids in the region are essentially filled with polymer. Further the term "pressurized section" when used in reference to the extruder refers to that area under pressure from polymer flow and filled with polymer such that substantially no gaseous voids exist and further is sealed to such an extent that any solvent pumped into the area is substantially maintained below its vaporization point. The negative conveyance element 8 at the end of the first zone 10 keeps the mixing elements 18 filled with polymer and improves mixing.

Suitable free radical initiators include, but are not limited to, alkyl and dialkyl peroxides such as tertiary-butyl peroctoate (2-ethyl hexanoate) or 2,5-dimethyl-2,5-di(t-butylperoxy)hexyne-3. Initiators having higher stabilities are preferred.

The maleic anhydride is preferably mixed in a non-reactive solvent such as ketones, benzene, alkyl acetates, or chlorinated benzenes and stored in a maleic anhydride feed tank 30. The maleic anhydride can be dissolved in the solvent up to its saturation level. Further, the free radical initiator can be mixed with the maleic anhydride during storage or injected into the extruder barrel 2 separately. The maleic anhydride and solvent solution is pumped from the storage tank 30 by a metering pump 32 and is injected into the first zone 10 through an injection nozzle 34. If the free radical initiator is added separately or if additional initiator is required, the free radical initiator can be stored in a solvent solution in a second storage tank 40 and pumped by a second metering pump 42 for injection into the first zone 10 through a second injection nozzle 44. The amount of initiator used does not appear to be critical and ratios of maleic anhydride to initiator of from about 1/0.015 to about 1/0.1 by weight have been found to be satisfactory, with ratios from 1/0.025 to 1/0.035 being preferred.

The temperature of the polymer in the first zone 10 will normally be below its melting point, and the polymer temperature in the second zone 12 must be high enough to keep the polymer in its molten state. Independent temperature control for each zone is desired because the polymers generally experience an increase in viscosity as maleic anhydride is grafted to the polymers. High melt temperatures, e.g. greater than 250° C., may require a more stable initiator than the ones mentioned above. Polymers having melt temperatures of 85° C. to 190° C. prior to feed injection have worked well when Lupersol 130 was used as the initiator.

The pressure in the first zone 10 is not critical. However, the area where the maleic anhydride is injected 34 into the extruder should be maintained at a pressure above the vaporization pressure of maleic anhydride, preferably at about 50 to 100 psig. The pressure in the third zone 14 and the fourth zone 16 must be sufficiently low to allow removal of solvent and unreacted maleic anhydride. Vacuum sources 50 are provided to reduce the pressure in the third and fourth zones 14 and 16, and a vacuum between 28 and 29.9 inches of mercury has proven sufficient to remove most of the unreacted maleic anhydride.

The temperature of the graft copolymer during devolatilization is preferably kept between about 160° C. and 300° C. to assist in devolatilization. Higher temperatures give lower volatile levels, but may lead to higher grain levels. Lower temperatures lead to higher volatile levels or more work input to remove the volatiles, but may result in lower grain levels. Temperatures of from about 180° C. to 260° C. are preferred to give the best balance of devolatilization and grain level.

The graft copolymer exits the extruder barrel 2 through a die face 60 which produces strands of the graft copolymer. The polymer strands can then be sent to a strand chopper 70 to prepare polymer pellets for use in other processes. As an alternative, an underwater pelletizer may optionally be employed in place of strand chopper 70. Either of these techniques are commonly known to those well versed in the art.

A multiple screw extruder particularly suited for this invention is a Werner-Pfleiderer ZSK-53/5L co-rotating, twin-screw extruder. This extruder can graft maleic anhydride to the polymer backbone at rates from 40 pounds per hour to 160 pounds per hour with no significant change in percent conversion. Production rates of up to the maximum for this equipment (about 300 pounds per hour) can even be obtainable. The backbone is preferably metered into the polymer feed inlet at a low enough rate to starve the extruder at the operating speed prior to the addition of maleic anhydride and the free radical initiator. The average residence times within the extruder ranges from about 140 seconds at 40 pounds per hour down to about 45 seconds at 160 pounds per hour polymer rates. A similarly equipped extruder of larger diameter also gives an equivalent product at higher rates.

The above described method and apparatus has been used to graft maleic anhydride to polymers to produce graft copolymers having up to about 2 percent by weight of maleic anhydride. The percent of incorporation of maleic anhydride is generally related to the ratio of maleic anhydride to polymer feed until about the level of maximum incorporation, generally about two percent. Preferred products generally incorporate from about 0.3 percent to about 1.5 percent maleic anhydride by weight, most preferably greater than 0.50 percent by weight, and most preferred greater than 0.75 percent by weight.

A conversion of 75 percent of the feed maleic anhydride to grafted maleic anhydride has been achieved for linear low density polyethylenes, and lower percent conversions are generally obtained for high density polyethylenes.

The graft copolymer produced from the process of this invention has improved color properties and when manufactured into a film improved grain properties. In particular, the yellowness index of a polymer according to the present invention as measured according to ASTM D-1925-70 is less than about 10.0, and usually less than about 8.75, and as measured in accordance with ASTM E-313-73 is generally less than about 11.0, usually less than about 8.75. Further, the whiteness index as measured according to ASTM E-313-73 is greater than 45.0. In addition, when processed into films the blends of this invention comprising a polyolefin and graft copolymer are characterized by a grain count of particle diameter size between 5 mils and 15 mils of less than about 3,000 per 1,000 square inches of 1.6 mil film. Such films have a highly glossy appearance and are suitable for use as a food packaging material in multilayer coextruded or laminated structures.

The polyolefin with which the graft copolymer of this invention is blended can be an ethylene homopolymer including LDPE and HDPE. In addition, suitable polyolefins for the production of films include polypropylene, poly (4-methyl pentene) and copolymers of ethylene and a $C_3$ to $C_{10}$ α-olefin, such as LLDPE, propylene and 1-butene, copolymers of ethylene and $C_4$-$C_8$ diolefins such as butadiene and copolymers of ethylene and an ethylenically unsaturated carboxylic acid or derivative such as vinyl acetate, acrylic acid, methacrylic acid, ethyl acrylate, butyl acrylate, methyl methacrylate, and methyl acrylate and copolymers of ethylene and carbon monoxide. The ratio of graft copolymer to polyolefin employed in the blend is generally between about 1.5: 98.5 to about 75:25 by weight, preferably about 2.5:97.5 to about 35:65 by weight, and most preferably about 5.0:95 to about 25:75 by weight.

The graft copolymer and polyolefin may be blended by methods known to one skilled in the art such as by use of a blender, mixer, kneader, roller, extruder, etc. Likewise, the production of multilayer films from such blends can be accomplished by techniques such as cast film, blown film, coextruded blow molding, coextruded sheeting, lamination or other techniques available to a skilled practitioner. The layers of such multilayer films (other than the layer comprising the blend of graft copolymer and polyolefin) may consist of such synthetic resins as polyamide (e.g. nylon, etc.), ethylene—vinyl alcohol copolymers, polyolefins (e.g. polypropylene, polyethylene, etc.) polyester, polycarbonate, and poly(-vinylindene chloride), cellulose and derivatives thereof, and metals.

The following examples provide details of making and using preferred graft copolymers by the method of the present invention. In the example, "melt flowability" represents the melt flow index as measured using ASTM D-1238, Standard Designation 190/10.0 (condition N). Yellowness index (A) was determined using ASTM D-1925-70. Whiteness Index and Yellowness Index (B) were determined using ASTM E-313-73.

EXAMPLE 1

A linear low density polyethylene sold under the trademark DOWLEX[1] LLDPE 2035, having a melt index of 6 dg/min and a density of 0.919 grams/cc, was fed into a Werner-Pfleiderer ZSK-53/5L co-rotating, twin-screw extruder operating at the following conditions:

[1] A trademark of The Dow Chemical Company. DOWLEX LLDPE 2035 is a copolymer of octene/ethylene.

| Zone No. | 1 | 2 | 3 | 4 |
|---|---|---|---|---|
| Barrel Temp., °C. | 215 | 228 | 233 | 235 |
| Melt Temp., °C. | 135 | 200 | 210 | 240 |
| Screw Speed 200 rpm | | | | |
| Polymer Rate 150 lb/hr | | | | |

A mixture of maleic anhydride/methyl ethyl ketone/LUPERSOL[2] 130 at a weight ratio of 1/1/0.03 was fed into the extruder through a Werner-Pfleiderer injection nozzle by a positive displacement metering pump at a rate of 2.24 pounds per hour. The injection nozzle was located just upstream of a series of kneading blocks or mixing type elements backed by a negative conveyance element which kept the portion of the extruder from some point upstream of the injection nozzle to the negative conveyance screw element polymer filled and pressurized. A vacuum of 29 inches of mercury was maintained on zones 3 and 4 to devolatilize the grafted polymer. The graft copolymer exhibited a maleic anhydride incorporation of 0.55 percent by weight of the grafted polymer.

[2] A trademark of Penwalt for 2,5-dimethyl-2,5-di(tertiary butylperoxy)-hexyne-3.

EXAMPLE 2

A high density polyethylene homopolymer sold as DOW HDPE 10062 having a melt index of 10 dg/min and a density of 0.962 g/cc was fed into the extruder of Example 1 under the following conditions:

| Zone No. | 1 | 2 | 3 | 4 |
|---|---|---|---|---|
| Barrel Temp., °C. | 170 | 230 | 220 | 220 |
| Screw Speed 230 rpm | | | | |
| Polymer Rate - 170 lb/hr. | | | | |

A 45/55/0.032 (methyl ethyl ketone/maleic anhydride/LUPERSOL 130) solution was fed through the injection nozzle at a rate of 5.9 lb/hr. The vacuum level at zones 3 and 4 was 29 inches mercury. The product contained 1.15% grafted maleic anhydride. This product was then blended with DOWLEX[3] LLDPE 2035, a linear low density polyethylene (LLDPE) having a melt index of 6 dg/min and a density of 0.919 g/cc, at a ratio of 11.5/88.5 (88.5% LLDPE), melt blended in an extruder, and then co-extruded as the adhesive (middle) layer in a three layer film including high density polyethylene and nylon. The resulting film, when converted into bags, has excellent structural integrity and is suitable for heating contained foods in a microwave oven.

[3] A trademark of The Dow Chemical Company. DOWLEX LLDPE 2035 is a copolymer of ocetene-/ethylene.

EXAMPLE 3

A high density ethylene homopolymer sold as DOW HDPE 10062 having a melt index of 10 dg/min. was fed into the extruder of Example 1 under the following conditions:

| Zone No. | 1 | 2 | 3 | 4 |
|---|---|---|---|---|
| Barrel Temp, °C. | 102 | 201 | 201 | 221 |
| Screw Speed - 300 rpm | | | | |
| Polymer Feed Rate - 200 lb/hr. | | | | |

Methyl ethyl ketone, maleic anhydride and LUPERSOL 130 were fed through the injection nozzle at 3.4, 3.4 and 0.10 lb/hr., respectively. The injection nozzle was located just upstream of a series of kneading blocks or mixing type elements backed by a negative conveyance element which kept the entire injection area polymer filled and pressurized. The vacuum level at zones 3 and 4 was 29 inches mercury. The resulting product contained 1.02% incorporated maleic anhydride representing a conversion of 63.0% of the feed maleic anhydride to incorporated anhydride.

The resulting graft copolymers exhibited the following properties:

| Melt Flowability | 9.8 |
|---|---|

| -continued | |
|---|---|
| Whiteness Index | 49.94 |
| Yellowness Index (A) | 8.53 |
| Yellowness Index (B) | 8.69 |

(COMPARATIVE) EXAMPLES 4-6

These examples demonstrate that higher yellowness and lower whiteness indices are obtained when the maleic anhydride and initiator are not injected into a polymer filled section of the extruder.

Into the polymer feed section of the extruder of Example 1 were added Dow HDPE 10062, maleic anhydride (MAH) and LUPERSOL 130. The extruder was operated at the following conditions:

| | EXAMPLE NOS. | | |
|---|---|---|---|
| | 4 | 5 | 6 |
| Barrel Temp., °C. | | | |
| Zone 1 | 181 | 181 | 184 |
| Zone 2 | 199 | 200 | 203 |
| Zone 3 | 204 | 203 | 201 |
| Zone 4 | 200 | 194 | 232 |
| Screw Speed, rpm | 250 | 250 | 300 |
| Polymer Feed Rate, lb/hour | 100 | 100 | 200 |
| MAH Feed Rate, lb/hour | 1.9 | 1.9 | 3.8 |
| LUPERSOL Feed Rate, lb/hour | 0.1 | 0.25 | 0.1 |

The vacuum level at zones 3 and 4 was 29.88 inches mercury. The injection nozzle was arranged as in Example 3 above.

The resulting graft copolymers exhibited the properties summarized in Table I.

TABLE I

| | EXAMPLE NOS. | | |
|---|---|---|---|
| | 4 | 5 | 6 |
| Melt Flowability | 5.2 | 0.9 | 8.2 |
| MAH Incorporation (% by wt) | 0.98 | 1.20 | 1.11 |
| MAH Conversion (% by wt) | 51.5 | 53.7 | 58.4 |
| Whiteness Index | 37.12 | -9.56 | 42.36 |
| Yellowness Index (A) | 12.78 | 28.22 | 11.13 |
| Yellowness Index (B) | 13.34 | 30.31 | 11.59 |

(COMPARATIVE) EXAMPLE 7

This example illustrates the importance in the design of the screw elements of the extruder.

A twin screw extruder similar to that of Example 1 was used except that the negative conveyance element was replaced by a positive conveyance element. (As a result, the extruder was not polymer filled or pressurized at the injection point.) A vacuum level of 29 inches of mercury was maintained on zones 3 and 4 to devolatilize the graft copolymer.

Into zone 2 of the extruder were added MAH, LUPERSOL 130 and methyl ethyl ketone (MEK). The operating conditions of the extruder were:

| ZONE NO. | 1 | 2 | 3 | 4 |
|---|---|---|---|---|
| Barrel Temp., °C. | 85 | 199 | 192 | 192 |
| Screw Speed, rpm | 300 | | | |
| MAH Feed Rate | 3.7 lb/hr. | | | |
| MEK Feed Rate | 3.7 lb/hr. | | | |

| ZONE NO. | 1 | 2 | 3 | 4 |
|---|---|---|---|---|
| LUPERSOL Feed Rate | 0.11 lb/hr. | | | |

DOW HDPE 10062 was fed into the extruder at a rate of 200 pounds per hour.

Properties of the resulting graft copolymers were:

| | |
|---|---|
| Melt Flowability | 15.4 |
| MAH Conversion (% by wt) | 17.3 |
| MAH Incorporated (% by wt) | 0.32 |
| Whiteness Index | 56.84 |
| Yellowness Index (A) | 6.28 |
| Yellowness Index (B) | 7.10 |

Additionally, this graft copolymer had an unacceptably strong, unpleasant odor due to residual monomer.

EXAMPLES 8–12

158 grams of the products obtained in Example 3 and Comparative Examples 4–7 above were melt blended with 1242 grams of DOWLEX[4] LLDPE 4035 using a three zone, one-inch single screw extruder with a length/diameter ratio of 24:1, barrel temperature of 325° F. in Zone 1 and 375° F. in zones 2 and 3. The resulting pellets were then fed to a three-quarter inch Killion single screw blown film extruder having a barrel temperature in zones 1 and 2 of 300° F. and 375° F. respectively, and 375° F. in die zones 1 and 2. A frost-line of three inches was maintained in each case. The extruded monolayer film had a final maleic anhydride comonomer content of 0.13% by weight.

[4]A trademark of The Dow Chemical Company. DOWLEX LLDPE 4035 is a linear low density polyethylene (LLDPE) having a melt index of 5.5 dg/min and a density of 0.919 g/cc.

An 8 inch wide film having a thickness of 1.6 mils of each of Example 3 and Comparative Examples 4–7 (C. 4–7) was placed on a light box. A 1.5 inch×0.5 inch template was placed over the film. The number of grains having a diameter between 5 and 15 mils within the template area under a 10 fold magnification lamp (Art Specialty Co., Chicago, Ill.) were then determined. The results, tabulated below, are expressed in units of number of grains per 1,000 square inches of 1.6 mil film.

| EXAMPLE NO. | | | | |
|---|---|---|---|---|
| 3 | C.4 | C.5 | C.6 | C.7 |
| 2,773 | 8,107 | 15,819 | 4,053 | * |

*Could not be made into films using blend levels which give a maleic anhydride content suitable for adhesive performance.

We claim:

1. A graft copolymer comprising the reaction product of maleic anhydride and a backbone polymer which has a yellowness index as measured according to ASTM D-1925 of less than 10.0 and wherein between 0.50 and 2.0 weight percent of said graft copolymer comprises maleic anhydride and further wherein said backbone polymer is selected from the group consisting of polyolefins, linear copolymers of ethylene and carbon monoxide and copolymers of ethylene and ethylenically unsaturated carboxylic acids or derivatives thereof.

2. The graft copolymer of claim 1, wherein said polyolefin is selected from the group consisting of high density polyethylene, low density polyethylene, and copolymers of ethylene and a $C_3$ to $C_{10}$ olefin.

3. The graft copolymer of claim 1, wherein said polyolefin is polypropylene or poly(4-methylpentene).

4. The graft copolymer of claim 1, wherein said ethylenically unsaturated carboxylic acid or derivatives thereof is a member selected from the group consisting of acrylic acid, methacrylic acid, ethyl acrylate, butyl acrylate, methyl methacrylate, methyl acrylate and vinyl acetate.

5. The graft polymer of claim 1, wherein said polyolefin polymer is a copolymer of ethylene and carbon monoxide.

6. The graft copolymer of claim 2, wherein said yellowness index is less than about 8.75.

7. The graft copolymer of claim 3, wherein said yellowness index is less than about 8.75.

8. The graft copolymer of claim 4, wherein said yellowness index is less than about 8.75.

9. The graft copolymer of claim 5, wherein said yellowness index is less than about 8.75.

10. The graft copolymer of claim 1, wherein the whiteness index as measured according to ASTM E-313-73 is greater than 45.0.

11. A graft copolymer produced by the steps of:
melting a polymer selected from the group consisting of polyolefins, copolymers of ethylene and carbon monoxide and copolymers of ethylene and ethylenically unsaturated carboxylic acids or derivatives thereof by heating and shearing said polymer in a multiple screw extruder comprising positive and negative conveyance screw elements;
injecting maleic anhydride and a free radical initiator into a polymer filled, pressurized section of the extruder; and
mixing the polymer and the maleic anhydride in the extruder for sufficient time to graft the maleic anhydride to the polymer.

12. The graft copolymer of claim 11, wherein the maleic anhydride and the free radical initiator are mixed within a solvent system prior to injection into the extruder.

13. The graft copolymer of claim 11, further comprising the step of devolatilizing the polymer in at least one decompression zone of the extruder.

14. The graft copolymer of claim 12, wherein the maleic anhydride and the free radical initiator are mixed within a ketone prior to injection.

15. The graft copolymer of claim 14, wherein the polymer is a high density polyethylene resin.

16. The graft copolymer of claim 14, wherein the ketone is methyl ethyl ketone.

17. The graft copolymer of claim 14, wherein the ketone is acetone.

18. The graft copolymer of claim 14, wherein the polymer is a linear low density copolymer of ethylene/octene.

19. The graft copolymer of claim 18, wherein the ketone is methyl ethyl ketone.

20. The graft copolymer of claim 18, wherein the ketone is acetone.

21. The graft copolymer of claim 1, wherein said polyolefin is selected from the group consisting of linear copolymers of ethylene and α-olefins having between about 3 to about 10 carbon atoms.

22. The graft copolymer of claim 11, wherein said polyolefin is selected from the group consisting of linear copolymers of ethylene and α-olefins having between about 3 to about 10 carbon atoms.

* * * * *